(12) United States Patent
Suzuki et al.

(10) Patent No.: US 11,025,335 B2
(45) Date of Patent: Jun. 1, 2021

(54) SYSTEM INFORMATION PROCESSING APPARATUS AND INFORMATION PROCESSING METHOD

(71) Applicant: TOYOTA JIDOSHA KABUSHIKI KAISHA, Toyota (JP)

(72) Inventors: Koichi Suzuki, Miyoshi (JP); Toru Nishitani, Nisshin (JP); Jun Usami, Toyota (JP); Minami Yoda, Tokyo (JP); Kensuke Koike, Nisshin (JP); Tsuyoshi Ogawa, Okazaki (JP); Yohei Tanigawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/846,840

(22) Filed: Apr. 13, 2020

(65) Prior Publication Data

US 2020/0328800 A1    Oct. 15, 2020

(30) Foreign Application Priority Data

Apr. 15, 2019   (JP) .............................. JP2019-077093

(51) Int. Cl.
| | |
|---|---|
| *H04B 7/155* | (2006.01) |
| *H04B 17/318* | (2015.01) |
| *H04W 84/04* | (2009.01) |
| *H04W 16/26* | (2009.01) |
| *H04W 84/00* | (2009.01) |
| *H04W 24/02* | (2009.01) |
| *H04W 4/40* | (2018.01) |

(52) U.S. Cl.
CPC ....... *H04B 7/15507* (2013.01); *H04B 17/318* (2015.01); *H04W 4/40* (2018.02); *H04W 16/26* (2013.01); *H04W 84/047* (2013.01)

(58) Field of Classification Search
CPC ... H04B 7/15507; H04B 17/318; H04W 4/40; H04W 16/26; H04W 84/047
See application file for complete search history.

(56) References Cited

U.S. PATENT DOCUMENTS

| | | | | | |
|---|---|---|---|---|---|
| 5,944,132 | A | * | 8/1999 | Davies ................... | A63B 57/00 180/168 |
| 7,697,450 | B2 | * | 4/2010 | D'Amico ............... | H04B 7/155 370/252 |
| 8,103,212 | B1 | * | 1/2012 | Pezeshkian ........ | H04B 7/15514 455/13.1 |

(Continued)

FOREIGN PATENT DOCUMENTS

JP    2017-062689 A    3/2017

*Primary Examiner* — Dominic E Rego
(74) *Attorney, Agent, or Firm* — Sughrue Mion, PLLC (57) ABSTRACT

Provided is a system including: a first vehicle equipped with a land mobile station for mobile communication; and a second vehicle that transports the first vehicle and a user holding a terminal for mobile communication. The system further includes a control unit configured to acquire radio wave intensity of the mobile communication at a current location of the second vehicle, and generate, when the acquired radio wave intensity is less than a predetermined intensity, a command to unload the first vehicle from the second vehicle; and generating a command to relay the mobile communication by the land mobile station of the first vehicle.

6 Claims, 7 Drawing Sheets

(56) References Cited

U.S. PATENT DOCUMENTS

| | | | | |
|---|---|---|---|---|
| 8,909,130 B1* | 12/2014 | Burmeister | | H01Q 9/32 |
| | | | | 455/7 |
| 2006/0034159 A1* | 2/2006 | Sano | | G04R 20/08 |
| | | | | 368/47 |
| 2010/0026310 A1* | 2/2010 | Shimp | | G01R 31/083 |
| | | | | 324/527 |
| 2011/0021234 A1* | 1/2011 | Tibbitts | | H04W 4/029 |
| | | | | 455/517 |
| 2012/0321420 A1* | 12/2012 | Mears | | B60P 3/36 |
| | | | | 414/462 |
| 2013/0138237 A1* | 5/2013 | Chen | | H01L 21/67733 |
| | | | | 700/113 |
| 2016/0165548 A1* | 6/2016 | Mohlmann | | H04W 52/46 |
| | | | | 455/522 |
| 2018/0098227 A1* | 4/2018 | Carnelli | | H04W 16/18 |
| 2019/0025846 A1* | 1/2019 | Wu | | B65G 69/2882 |
| 2019/0130763 A1* | 5/2019 | Kawasaki | | H04W 84/005 |
| 2019/0135158 A1* | 5/2019 | Outoukian | | B60L 53/14 |
| 2019/0236941 A1* | 8/2019 | Lindsay | | B60Q 1/44 |
| 2020/0027346 A1* | 1/2020 | Lisewski | | G08G 1/0112 |
| 2020/0031642 A1* | 1/2020 | Uchimura | | G05D 1/024 |
| 2020/0092685 A1* | 3/2020 | Fehrenbach | | H04B 7/2606 |
| 2020/0103882 A1* | 4/2020 | Sullivan | | B66F 9/063 |

* cited by examiner

SYSTEM INFORMATION PROCESSING APPARATUS AND INFORMATION PROCESSING METHOD

INCORPORATION BY REFERENCE

The disclosure of Japanese Patent Application No. 2019-077093 filed on Apr. 15, 2019 including the specification, drawings and abstract is incorporated herein by reference in its entirety.

BACKGROUND

1. Technical Field

The present disclosure relates to a system, an information processing apparatus, and an information processing method.

2. Description of Related Art

A technology for downloading content before a vehicle moves out of range of a regular communication network is well known in the art (for example, see JP-A-2017-062689).

SUMMARY

After the vehicle moves out of range of the normal communication network, the user cannot communicate. The present disclosure is intended to enable communication over a wider range while traveling in a vehicle.

An aspect of the present disclosure is to provide a system including: a first vehicle equipped with a land mobile station for mobile communication; and a second vehicle that transports the first vehicle and a user holding a terminal for mobile communication. The system further includes a control unit configured to: acquire a measurement result of radio wave intensity of the mobile communication at a current location of the second vehicle, and generate, when the acquired radio wave intensity is less than a predetermined intensity, a command to unload the first vehicle from the second vehicle; and generate a command to relay the mobile communication by the land mobile station of the first vehicle.

Another aspect of the present disclosure is to provide an information processing apparatus, including: a control unit configured to control a second vehicle transporting a first vehicle that is equipped with a land mobile station for mobile communication and relays the mobile communication, and a user that holds a terminal for mobile communication. The control unit is configured to acquire a measurement result of radio wave intensity of the mobile communication at a current location of the second vehicle, and generate, when the acquired radio wave intensity is less than a predetermined intensity, a command to unload the first vehicle from the second vehicle.

Another aspect of the present disclosure is to provide an information processing method that controls a second vehicle and is executed by a computer. The second vehicle transports a first vehicle that is equipped with a land mobile station for mobile communication and relays the mobile communication, and a user that holds a terminal for mobile communication. The information processing method includes a step of acquiring a measurement result of radio wave intensity of the mobile communication at a current location of the second vehicle, and a step of generating, when the acquired radio wave intensity is less than a predetermined intensity, a command to unload the first vehicle from the second vehicle.

According to another aspect of the present disclosure, a program for causing a computer to execute the information processing method, or a non-transitory computer-readable storage medium for storing the program is provided.

According to the present disclosure, it is possible to enable communication over a wider range while traveling with a vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A system according to one aspect of the present disclosure includes a first vehicle equipped with a land mobile station for mobile communication, and a second vehicle for transporting the first vehicle. The second vehicle also transports a user who holds a terminal for mobile communication. The terminal held by the user (hereinafter, also referred to as a user terminal) can communicate with the land mobile station mounted on the first vehicle. The second vehicle can also communicate with the land mobile station mounted on the first vehicle. The land mobile station mounted on the first vehicle relays the communication between the user terminal and a base station, and the communication between the user terminal and the second vehicle. In a case where communication with the base station is possible, the user terminal communicates directly with the base station. However, if a distance between the second vehicle and the base station is increased, for example, while the second vehicle travels, it may be difficult for the base station and the user terminal to directly communicate with each other because the radio wave intensity is reduced. Therefore, by relaying the communication with the first vehicle, a state in which the user terminal and the second vehicle can communicate with the base station is maintained. One second vehicle can transport a plurality of first vehicles and a plurality of user terminals.

The control unit acquires the radio wave intensity (measurement result) of the mobile communication at a current location of the second vehicle. In addition, the control unit may acquire the radio wave intensity (measurement result) of any of the first vehicle, the second vehicle, and the user terminal. Moreover, in a case where the acquired radio wave intensity is less than a predetermined intensity, the control unit generates a command to unload the first vehicle from the second vehicle. The predetermined intensity is a radio wave intensity at which mobile communication is possible by the user terminal or the second vehicle, but the mobile communication may be difficult when the first vehicle does not relay. For example, the predetermined intensity is determined so that a communication speed is a speed obtained by adding a certain margin to a lower limit of the allowable communication speed. If the acquired radio wave intensity is less than the predetermined intensity, the communication speed between the user terminal or the second vehicle, and the base station may fall outside an allowable range or the communication may be difficult at a destination of the second vehicle. Before the communication is disconnected, the control unit generates a command to unload the first vehicle from the second vehicle so that the communication relay can be performed by the first vehicle. According to this command, for example, the second vehicle may be stopped, and a device for unloading the first vehicle from the second vehicle may be actuated. The control unit generates a command to relay the mobile communication by the land mobile station of the first vehicle. If the command enables the relay of mobile communication by the first vehicle, a range in which the user terminal and the second vehicle can communicate becomes wider.

The control unit may further execute acquiring the radio wave intensity (measurement result) of the mobile communication at a current location of the first vehicle after the first vehicle is unloaded from the second vehicle; and in a case where the acquired radio wave intensity of the mobile communication at the current location of the first vehicle is less than a lower limit intensity that is less than the predetermined intensity, generating a command to move the first vehicle to an area where the radio wave intensity of the mobile communication is equal to or higher than the lower limit intensity. The lower limit intensity is radio wave intensity less than the predetermined intensity, at which mobile communication is possible by the user terminal or the second vehicle, but the mobile communication may be difficult if the first vehicle does not move. For example, the lower limit intensity may be determined so as to be a lower limit of the allowable communication speed. According to this command, the first vehicle autonomously travels to enter an area where the radio wave intensity of the mobile communication is equal to or higher than the lower limit intensity. Accordingly, even in a case where a radio wave state changes, it is possible to maintain the relay of the mobile communication by the land mobile station of the first vehicle. The area where the radio wave intensity is equal to or higher than the lower limit intensity may be an area previously stored or searched based on the acquired radio wave intensity.

The second vehicle may transport a plurality of first vehicles. The control unit may, each time the radio wave intensity at a current location of the second vehicle is less than the predetermined intensity, execute: generating a command to unload the first vehicle from the second vehicle; and generating a command to relay the mobile communication by the land mobile station of the first vehicle. By unloading the first vehicle every time the radio wave intensity becomes less than the predetermined intensity, the relay is possible by communication between the first vehicles, thus the user terminal and the second vehicle can communicate in a wider range.

Hereinafter, embodiments of the present disclosure will be described with reference to the drawings. Configurations of the following embodiments are merely an example, and the present disclosure is not limited to those configurations of the embodiments. Further, the following embodiments can be combined as much as possible.

First Embodiment

Figure 1:
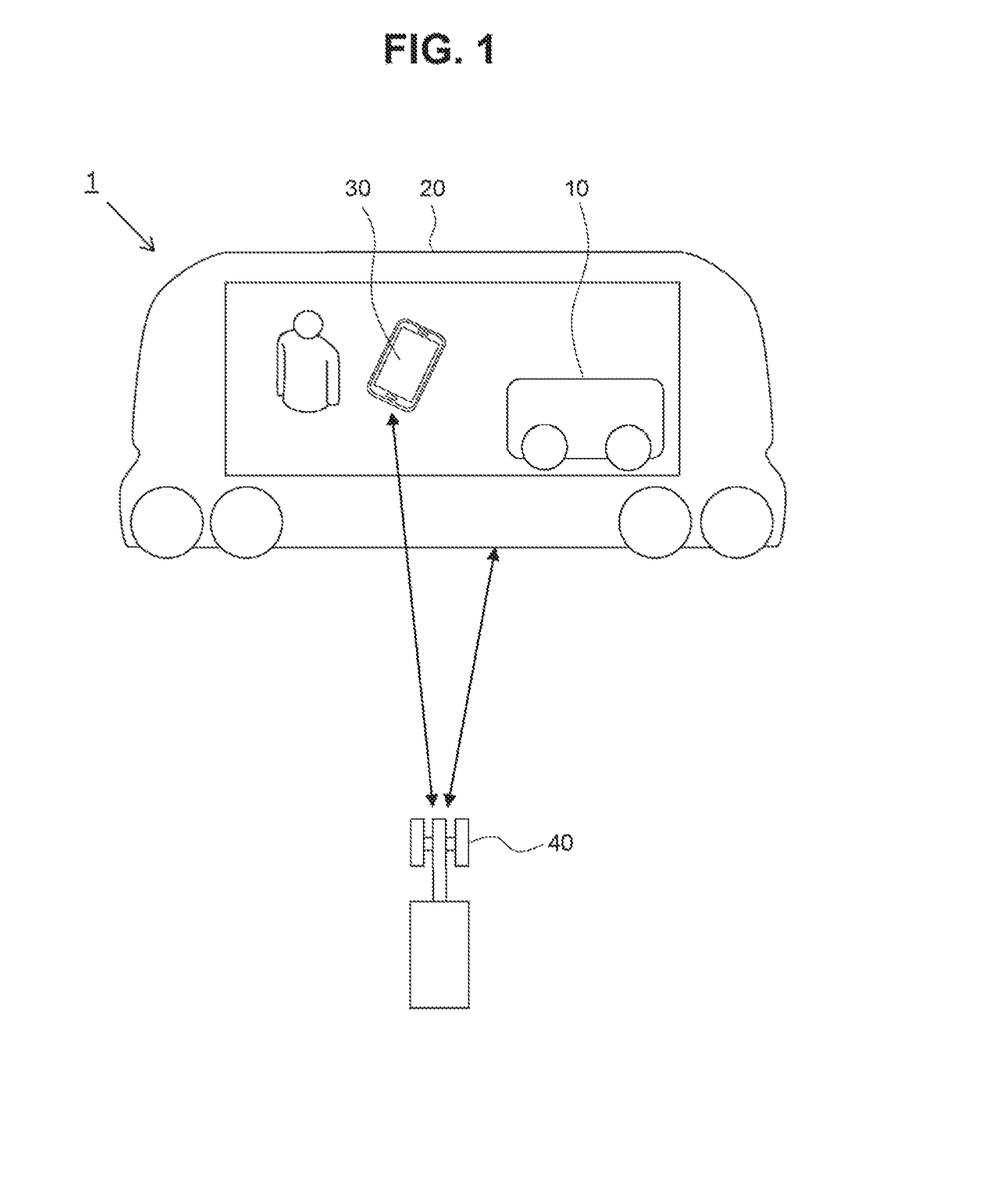
FIG. 1 is a diagram illustrating a schematic configuration of a system according to an embodiment of the present disclosure.

FIG. 1 is a diagram illustrating a schematic configuration example of a system 1 according to an embodiment of the present disclosure. The system 1 shown in FIG. 1 includes a first vehicle 10, a second vehicle 20, a user terminal 30, and a wireless base station 40. The first vehicle 10 is configured to be mountable on the second vehicle 20. The second vehicle 20 is configured so that the first vehicle 10 can be loaded and a user can board. The second vehicle 20 is a vehicle that transports the first vehicle 10 and the user. The user terminal 30 is a terminal held by the user transported by the second vehicle 20. The wireless base station 40 communicates with the first vehicle 10, the second vehicle 20, and the user terminal 30. In FIG. 1, it is illustrated that the first vehicle 10, the second vehicle 20, the user terminal 30, and the wireless base station 40 are respectively singular, but the number is not limited thereto. For example, a plurality of first vehicles 10 and a plurality of users (that is, a plurality of user terminals 30) may be loaded together on the second vehicle 20. The first vehicle 10 and the second vehicle 20 are self-driving vehicles.

Figure 2:
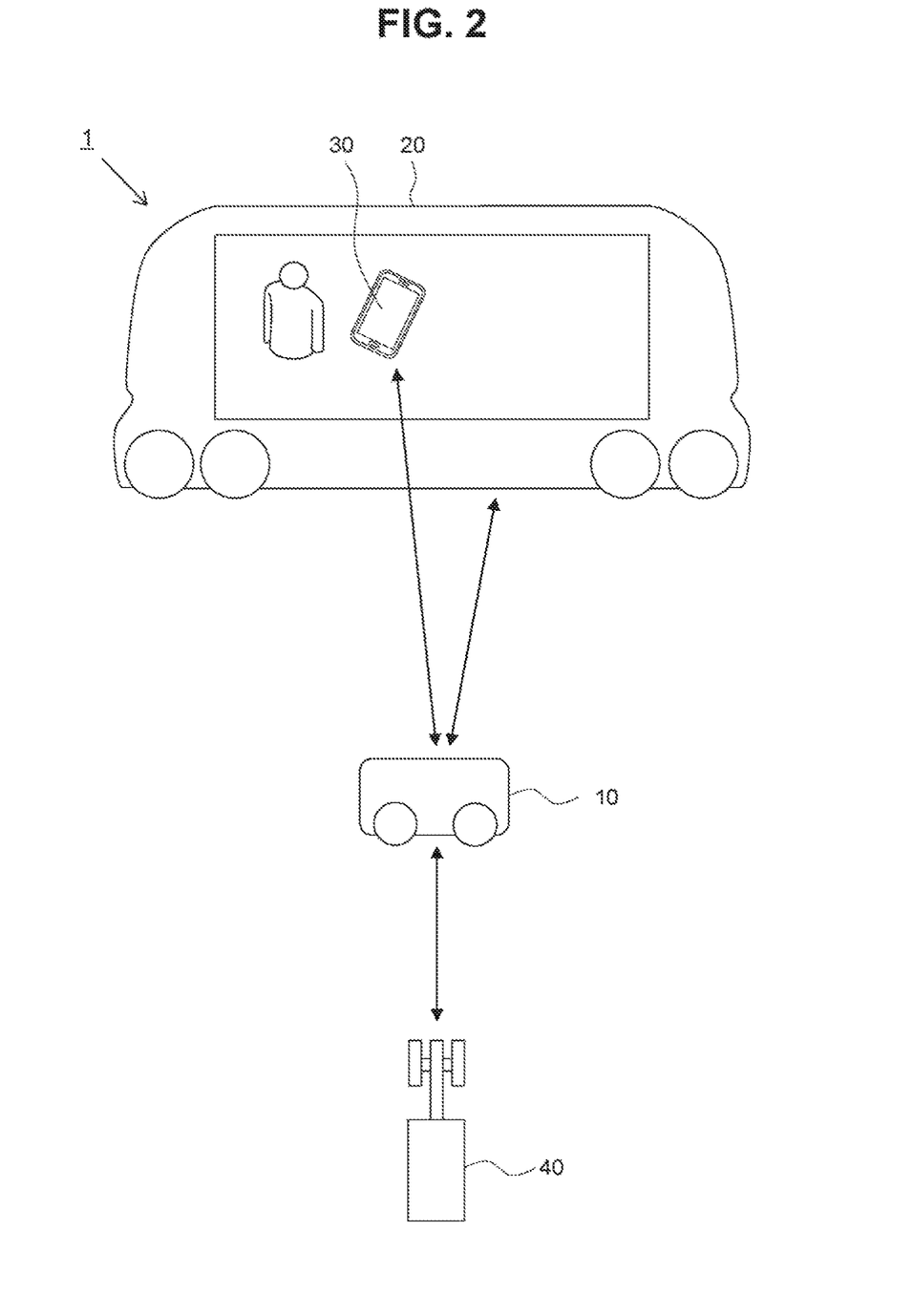
FIG. 2 is a diagram illustrating a schematic configuration of the system in a case where communication is relayed by the first vehicle.

The system 1 shown in FIG. 1 performs the communication between the wireless base station 40 and the second vehicle 20 and, when the radio wave intensity is lower than a threshold, unloads the first vehicle 10 from the second vehicle 20 and allows the first vehicle 10 to relay the communication. FIG. 2 is a diagram illustrating a schematic configuration of the system 1 in a case where the communication is relayed by the first vehicle 10. The first vehicle 10 which is unloaded from the second vehicle 20 is equipped with a land mobile station that relays the communication between the wireless base station 40 and the first vehicle 10. In addition, the first vehicle 10 may remain at a point where the first vehicle 10 was unloaded from the second vehicle 20, or may move from such a point. Since the first vehicle 10 relays the communication, it is possible to prevent the communication of the second vehicle 20 and the user terminal 30 with the wireless base station 40 from being disconnected, and to prevent the communication speed from falling outside the allowable range.

The communication may be, for example, telephone communication using, for example, a mobile phone, but is not limited thereto, and may include other forms of communication such as a wireless LAN (Local Area Network).

Hardware Configuration

Figure 3:
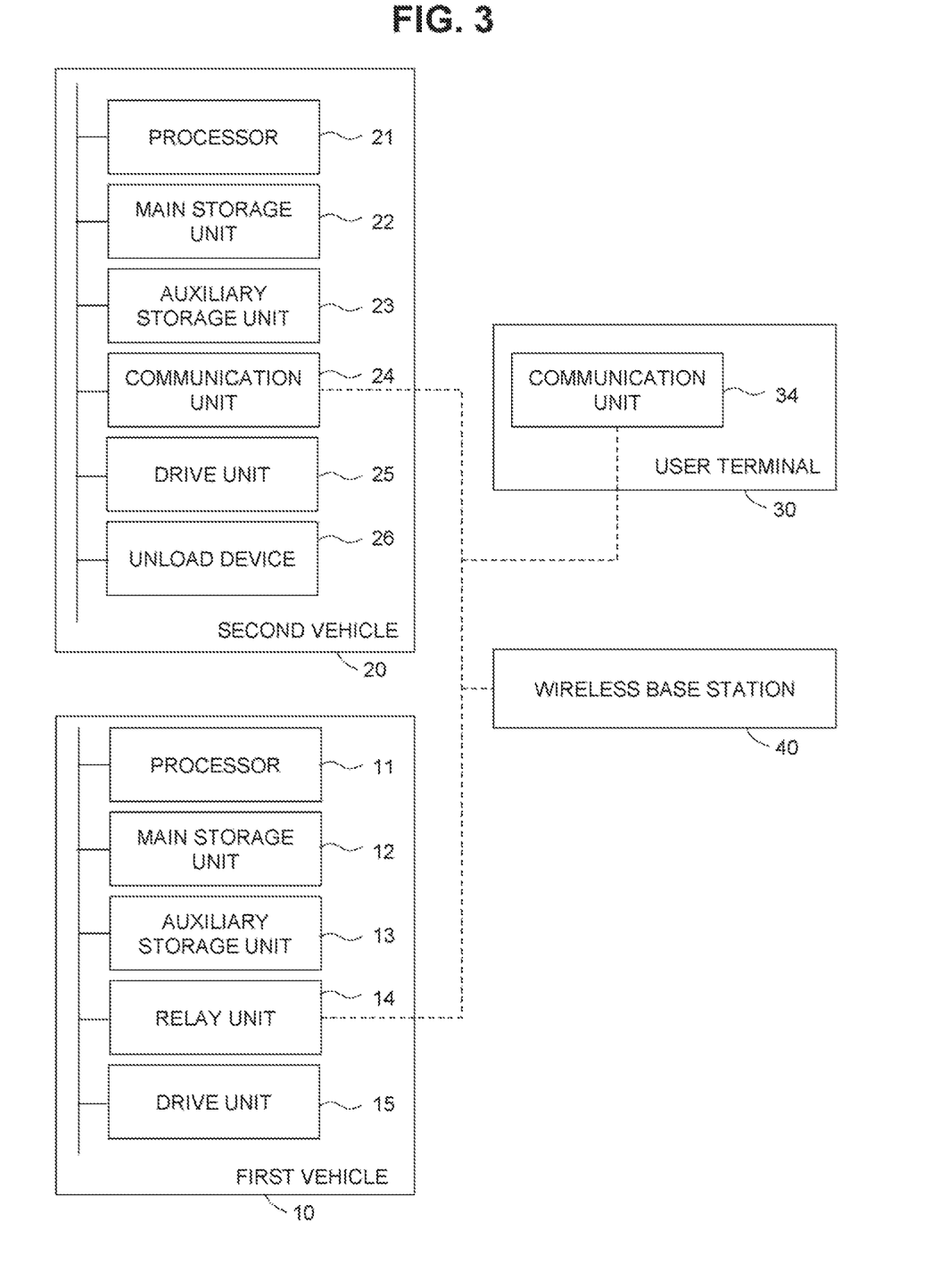
FIG. 3 is a block diagram schematically illustrating one example of a configuration of a first vehicle, a second vehicle, and a user terminal according to the embodiment.

A hardware configuration of the system 1 will be described referring to FIG. 3. FIG. 3 is a block diagram schematically illustrating one example of a configuration of the first vehicle 10, the second vehicle 20, and the user terminal 30 according to the present embodiment.

The second vehicle 20 includes a processor 21, a main storage unit 22, an auxiliary storage unit 23, a communication unit 24, a drive unit 25, and a unload device 26. These components are connected to each other by a bus. The processor 21 is a CPU (central processing unit), a DSP (digital signal processor), or the like. The processor 21 performs various information process calculations for controlling the second vehicle 20. The processor 21 is one example of the "control unit".

The main storage unit 22 may be a RAM (random access memory), a ROM (read only memory), or the like. The auxiliary storage unit 23 may be an EPROM (erasable programmable ROM), an HDD (hard disk drive), a removable medium, or the like. The auxiliary storage unit 23 stores an operating system (OS), various programs, various tables, and the like. The processor 21 loads the program stored in the auxiliary storage unit 23 into a working area of the main storage unit 22 and executes such a program. Each component is controlled by executing the program. The main storage unit 22 and the auxiliary storage unit 23 are computer-readable recording media. The configuration shown in FIG. 3 may be implemented by several computers that cooperate with each other. Additionally, the information stored in the auxiliary storage unit 23 may be stored in the main storage unit 22. Further, the information stored in the main storage unit 22 may be stored in the auxiliary storage unit 23.

The communication unit 24 communicates with the wireless base station 40 or the first vehicle 10. The communication unit 24 is a circuit for communicating with the wireless base station 40 or the first vehicle 10 using, for example, a mobile communication service (telephone communication network such as 3G (3rd Generation) or LTE (long term evolution), or wireless communication such as Wi-Fi (trademark).

The drive unit 25 allows the second vehicle 20 to travel based on a control command generated by the processor 21. The drive unit 25 may include, for example, a motor, an inverter, a brake, a steering mechanism, and the like, for driving wheels included in the second vehicle 20. The autonomous travel of the second vehicle 20 is implemented by driving the motor, the brake or the like according to the control command.

The unload device 26 allows the second vehicle 20 to unload the first vehicle 10 based on a control command generated by the processor 21. The unload device 26 may have, for example, a slope or a rail for allowing the first vehicle 10 to travel when the first vehicle 10 is unloaded from the second vehicle 20, in which an actuator is operated to accommodate the slope inside the second vehicle 20 while the second vehicle 20 is traveling, and to extend the slope to the outside when the first vehicle 10 is unloaded from the second vehicle 20. The first vehicle 10 is unloaded from the second vehicle 20 by traveling on the slope. Further, the unload device 26 may include, for example, a crane or a rail instead of the slope. The actuator may be operated to move the first vehicle 10 to the outside of the second vehicle 20 by the crane or the rail. A method for unloading the first vehicle 10 from the second vehicle 20 is not particularly limited hereto.

A series of processes executed by the second vehicle 20 can be executed by hardware, but can also be executed by software. The hardware configuration of the second vehicle 20 is not limited to that shown in FIG. 3.

The first vehicle 10 will be described hereinbelow. The first vehicle 10 includes a processor 11, a main storage unit 12, an auxiliary storage unit 13, a relay unit 14, and a drive unit 15. These components are connected to each other by a bus. The processor 11, the main storage unit 12, the auxiliary storage unit 13 and the drive unit 15 are the same as the processor 21, the main storage unit 22, the auxiliary storage unit 23 and the drive unit 25 of the second vehicle 20, thus descriptions will be omitted.

The relay unit 14 relays communication between the wireless base station 40, and the second vehicle 20 and the user terminal 30. The relay unit 14 is a circuit for communicating with the wireless base station 40, the second vehicle 20 and the user terminal 30, by means of, for example, a mobile communication service (telephone communication network such as 3G (3rd Generation) or LTE (long term evolution), wireless communication such as Wi-Fi (trademark).

The user terminal 30 will be described hereinbelow. The user terminal 30 may be, for example, a small computer such as a smartphone, a mobile phone, a tablet terminal, a personal information terminal, a wearable computer (such as a smart watch), or a personal computer (PC). The user terminal 30 includes a communication unit 34. The communication unit 34 is the same as the communication unit 24 of the second vehicle 20, and thus descriptions will be omitted.

Functional Configuration: Second Vehicle

Figure 4:
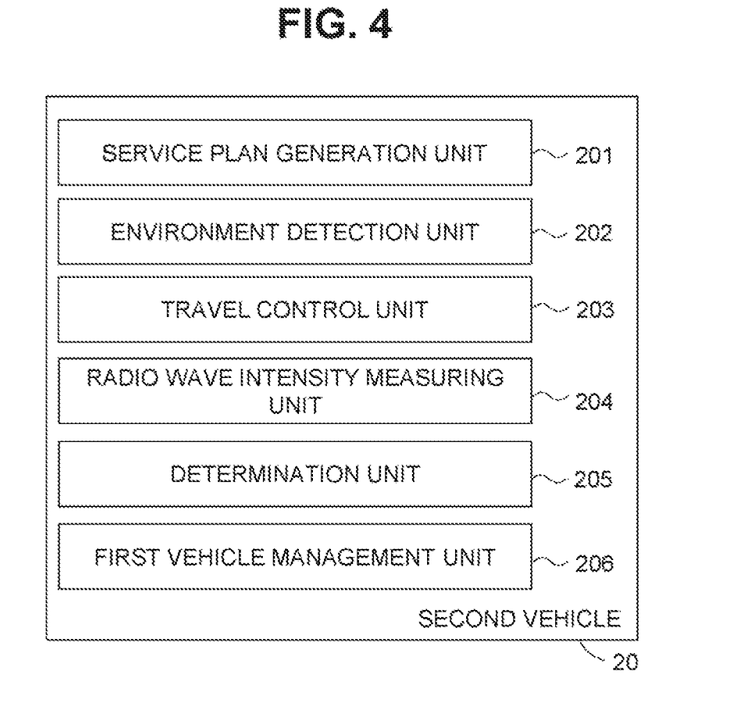
FIG. 4 is a diagram illustrating one example of a functional configuration of the second vehicle.

FIG. 4 is a diagram illustrating one example of a functional configuration of the second vehicle 20. The second vehicle 20 includes a service plan generation unit 201, an environment detection unit 202, a travel control unit 203, a radio wave intensity measuring unit 204, a determination unit 205, and a first vehicle management unit 206, as functional components. For example, the service plan generation unit 201, the environment detection unit 202, the travel control unit 203, the radio wave intensity measuring unit 204, the determination unit 205 and the first vehicle management unit 206 are the functional components implemented by executing various programs stored in the auxiliary storage unit 23 by the processor 21 of the second vehicle 20.

The service plan generation unit 201 acquires a service command from, for example, the external terminal or server, or the first vehicle management unit 206 described later, and generates its own service plan. The service command includes information on transit points and a destination through which the second vehicle 20 travels. The service plan generation unit 201 calculates a travel route of the second vehicle 20 and generates the service plan for moving along the travel route, based on the acquired service command.

The environment detection unit 202 detects the environment around the second vehicle 20 required for autonomous travel based on the data acquired by various sensors included in the second vehicle 20. Detection targets include, for example, but are not limited to, the number and positions of lanes, the number and positions of other moving vehicles around the second vehicle 20, the number and positions of obstacles (for example, pedestrians, bicycles, structures, buildings) around the second vehicle 20, road structures, road signs, and the like. Any detection target may be available as long as it is necessary for autonomous traveling. In a case where the sensor is, for example, a stereo camera, object detection is performed around the second vehicle 20 by performing image processing on image data captured by the sensor. Data on the environment around the second vehicle 20 (hereinafter referred to as "environment data") detected by the sensor is sent to the travel control unit 203 described later.

The travel control unit 203 generates a control command for controlling the autonomous travel of the second vehicle 20, based on the service plan generated by the service plan generation unit 201, the environment data generated by environment detection unit 202, and the like. For example, the travel control unit 203 generates the control command such that the second vehicle 20 travels along a predetermined route and an obstacle does not enter a predetermined safety area around the second vehicle 20. The generated control command is transmitted to the drive unit 25. A well-known method can be adopted as a method for generating a control command to allow the second vehicle 20 to autonomously travel.

The radio wave intensity measuring unit 204 measures a radio wave intensity of a signal received by the communication unit 24. A known circuit and calculation formula can be used for this measurement.

The determination unit 205 determines whether or not the radio wave intensity of the signal measured by the radio wave intensity measuring unit 204 is less than a predetermined intensity. The predetermined intensity is a radio wave intensity at which mobile communication is possible by the user terminal 30 or the second vehicle 20, but the mobile communication may be difficult when the first vehicle 10 does not relay. The predetermined intensity is determined so that the required communication quality can be maintained. This predetermined intensity may be a radio wave intensity such that a call quality falls within the allowable range, or alternatively, a radio wave intensity such that the call quality falls within the allowable range despite noise interference. The predetermined intensity is stored in the auxiliary storage unit 23. The determination unit 205 determines whether or not the radio wave intensity of the signal measured by the radio wave intensity measuring unit 204 is less than a predetermined intensity, and transmits the determination result to the first vehicle management unit 206.

The first vehicle management unit 206 generates, in a case where it is determined, by the determination unit 205, that the radio wave intensity is less than the predetermined intensity, a command to unload the first vehicle 10 from the second vehicle 20. The command includes a command to instruct the travel control unit 203 to stop the second vehicle 20, and a command to instruct the unload device 26 to unload the first vehicle 10 from the second vehicle 20. Further, the first vehicle management unit 206 generates a command to relay the mobile communication by the land mobile station of the first vehicle 10. This command may be a command to activate the first vehicle 10. For example, the first vehicle 10 may be mounted on the second vehicle 20 in a sleep mode, and may perform the autonomous travel and communication relay when activated.

Functional Configuration: First Vehicle

Figure 5:
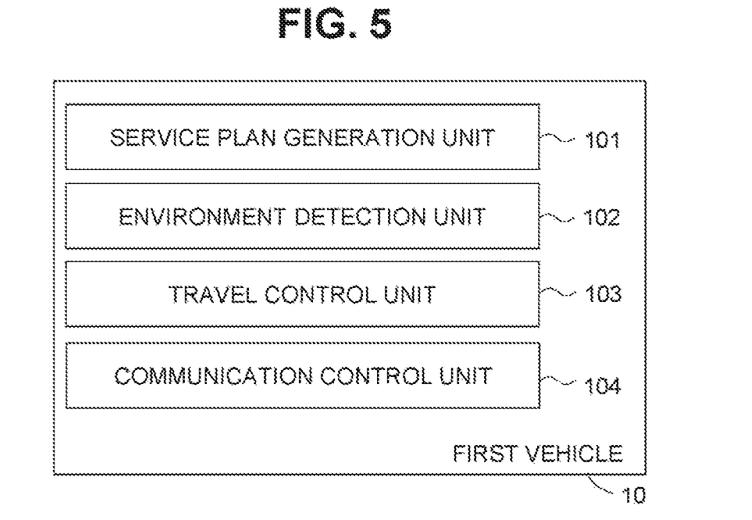
FIG. 5 is a diagram illustrating one example of a functional configuration of the first vehicle.

FIG. 5 is a diagram illustrating one example of a functional configuration of the first vehicle 10. The first vehicle 10 includes a service plan generation unit 101, an environment detection unit 102, a travel control unit 103, and a communication control unit 104 as functional components. For example, the service plan generation unit 101, the environment detection unit 102, the travel control unit 103, and the communication control unit 104 are the functional components implemented by executing various programs stored in the auxiliary storage unit 13 by the processor 11 of the first vehicle 10. The communication control unit 104 is one example of the land mobile station.

The service plan generation unit 101 acquires a service command from, for example, the external terminal or server, or the second vehicle 20, and generates its own service plan. The first vehicle 10 does not move but remains at the same location after being unloaded from the second vehicle 20. The service command includes information on transit points and a destination through which the first vehicle 10 travels, or information on maintaining a stopped state. The service plan generation unit 101 calculates a travel route of the first vehicle 10 and generates the service plan for moving along the travel route, based on the acquired service command.

The environment detection unit 102 and the travel control unit 103 are the same as the environment detection unit 202 and the travel control unit 203 of the second vehicle 20, and thus descriptions will be omitted.

The communication control unit 104 communicates with the second vehicle 20, the user terminal 30, and the wireless base station 40 via the relay unit 14. Specifically, a signal received from the wireless base station 40 is amplified or modulated and then transmitted to the second vehicle 20 or the user terminal 30, and a signal received from the second vehicle 20 or the user terminal 30 is amplified or modulated and then transmitted to the wireless base station 40. The relay can be implemented using known technologies.

Flow of Processing: Second Vehicle

Figure 6:
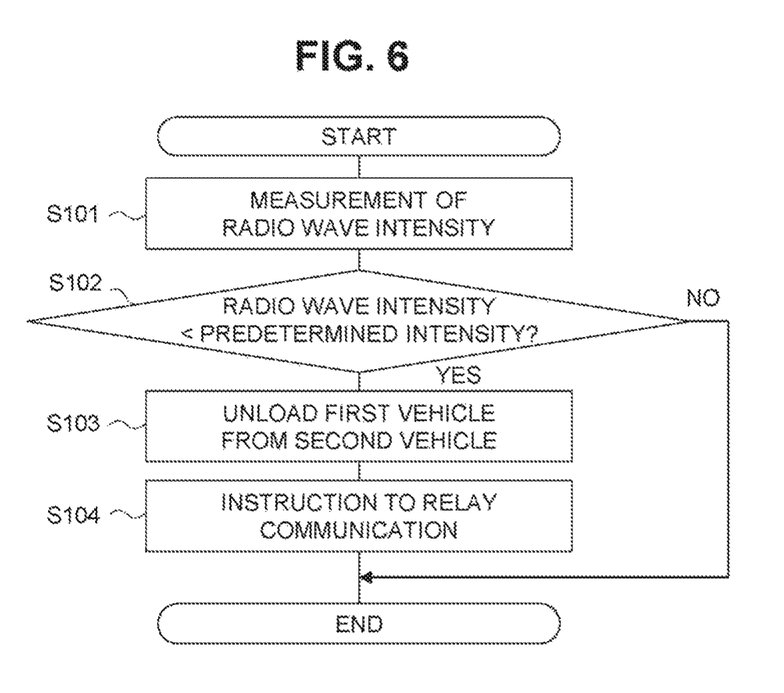
FIG. 6 is a flowchart illustrating one example of a process of unloading the first vehicle from the second vehicle.

Next, a process of the second vehicle 20 according to the first embodiment will be described with reference to FIG. 6. FIG. 6 is a flowchart illustrating one example of a process of unloading the first vehicle 10 from the second vehicle 20. The process in FIG. 6 is executed by the processor 21 at predetermined time intervals (for example, at fixed periodic intervals).

In step S101, the radio wave intensity measuring unit 204 measures radio wave intensity of the signal received by the communication unit 24. In step S102, the determination unit 205 determines whether or not the radio wave intensity measured in step S101 is less than the predetermined intensity. If it is determined as YES in step S102, the process proceeds to step S103. Otherwise, this routine is terminated. In step S103, the first vehicle management unit 206 generates a command to unload the first vehicle 10 from the second vehicle 20. The drive unit 25 and the unload device 26 are actuated based on this command. Next, in step S104, the first vehicle management unit 206 generates a command to relay the communication by the first vehicle 10, and transmits the command to the first vehicle 10. The first vehicle management unit 206 transmits an instruction to the travel control unit 203 to restart traveling of the second vehicle 20.

Flow of Processing: First Vehicle

Figure 7:
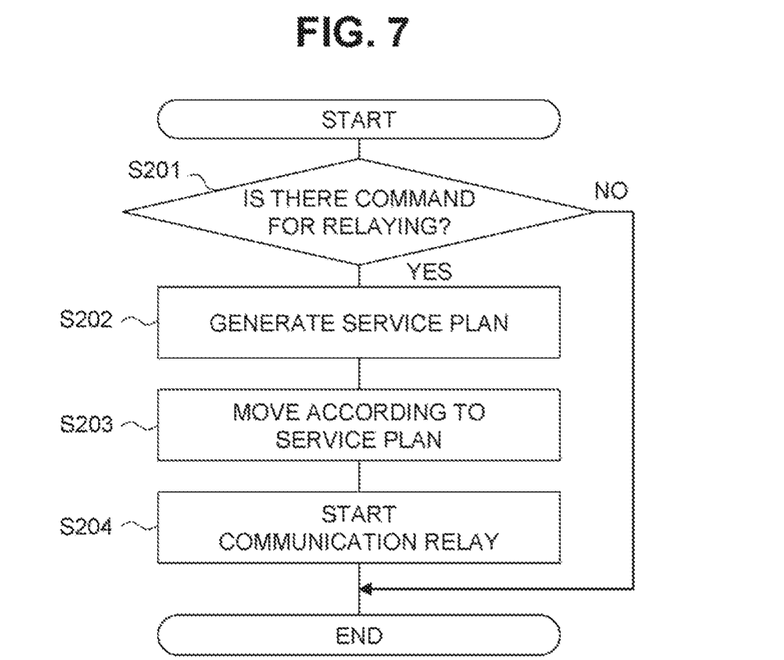
FIG. 7 is an exemplified flowchart illustrating a process of relaying by the first vehicle according to the embodiment.

A process of causing the first vehicle 10 to travel will be described hereinbelow. FIG. 7 is an exemplified flowchart illustrating a process of relaying by the first vehicle 10 according to the present embodiment. The process illustrated in FIG. 7 is executed at predetermined time intervals by the processor 11 of the first vehicle 10. The process of this flowchart is executed for the first vehicle 10 which is mounted on the second vehicle 20.

In step S201, the service plan generation unit 101 determines whether or not the command to relay communication has been received from the second vehicle 20. If it is determined as YES in step S201, the process proceeds to step S202. Otherwise, this routine is terminated. In step S202, the service plan generation unit 101 generates the service plan. The service plan is generated according to the rules previously stored in the auxiliary storage unit 13. For example, the service plan may be generated such that the first vehicle 10 travels within a predetermined range from a point where the first vehicle 10 unloaded from the second vehicle 20, or alternatively, travels to the nearest place where parking is available from the point where the first vehicle 10 is unloaded from the second vehicle 20. Map information and information on places where parking is available are stored in the auxiliary storage unit 13. In step S203, the travel control unit 103 allows the first vehicle 10 to travel according to the service plan. In step S204, the communication control unit 104 starts the communication relay between the wireless base station 40, the second vehicle 20, and the user terminal 30.

The first vehicle 10 which is unloaded from the second vehicle 20 may be collected by the second vehicle 20 when the second vehicle 20 returns, or alternatively, the first vehicle 10 may autonomously travel to a vehicle base at a predetermined time. Further, vehicles other than the second vehicle 20 may collect the first vehicle 10.

As described above, according to the present embodiment, the first vehicle 10 is transported by the second vehicle 20, and when the radio wave intensity of the signal from the wireless base station 40 is less than the predetermined intensity, the first vehicle 10 is unloaded from the second vehicle 20. As the first vehicle 10 performs the communication relay, it is possible to prevent the communication between the wireless base station 40 and the second vehicle 20 as well as the user terminal 30 from being interrupted, and to prevent the communication speed from falling outside the allowable range. Therefore, the range in which communication is possible while the second vehicle 20 travels can be further expanded.

Second Embodiment

In the second embodiment, when the radio wave intensity of the signal received by the first vehicle 10 is lower than the lower limit of radio wave intensity after the first vehicle 10 is unloaded from the second vehicle 20, the first vehicle 10 autonomously travels to an area where the radio wave intensity is equal to or higher than the lower limit. For example, the first vehicle 10 periodically measures the radio wave intensity and predicts a location where the radio wave intensity is stronger. The prediction can be implemented using known technologies. For example, when the radio wave intensity increases during traveling, the radio wave intensity can be further stronger by keeping going in the current traveling direction. On the other hand, when the radio wave intensity decreases during traveling, the radio wave intensity can be stronger by going in a direction opposite to the current traveling direction. Alternatively, for example, a map indicating the radio wave intensity for each area may be stored in advance, and the first vehicle 10 may move according to the map.

Functional Configuration: First Vehicle

Figure 8:
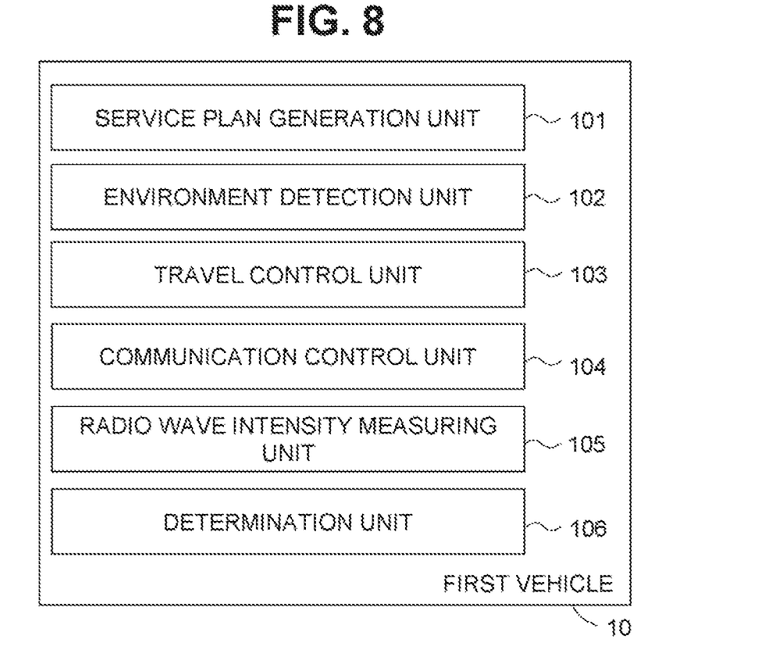
FIG. 8 is a diagram illustrating one example of a functional configuration of the first vehicle according to a second embodiment.

FIG. 8 is a diagram illustrating one example of a functional configuration of the first vehicle 10 according to the second embodiment. The first vehicle 10 includes the service plan generation unit 101, the environment detection unit 102, the travel control unit 103, the communication control unit 104, a radio wave intensity measuring unit 105, and a determination unit 106, as functional components. For example, the service plan generation unit 101, the environment detection unit 102, the travel control unit 103, the communication control unit 104, the radio wave intensity measuring unit 105 and the determination unit 106 are the functional components implemented by executing various programs stored in the auxiliary storage unit 13 by the processor 11 of the first vehicle 10. The service plan generation unit 101, the environment detection unit 102 and the travel control unit 103 are the same as those of the first vehicle 10 in the first embodiment, thus descriptions will be omitted. The radio wave intensity measuring unit 105 is the same as the radio wave intensity measuring unit 204 in the second vehicle 20, and thus descriptions will be omitted.

The determination unit 106 determines whether or not the radio wave intensity of the signal measured by the radio wave intensity measuring unit 105 is lower than a lower limit intensity. The lower limit intensity is a radio wave intensity less than the predetermined intensity, at which mobile communication is possible by the user terminal 30 or the second vehicle 20, but the mobile communication may be difficult if the first vehicle 10 does not move. For example, the lower limit intensity may be a lower limit of the radio wave intensity at which the communication relay is possible, or alternatively, may be a radio wave intensity obtained by adding a certain margin to the radio wave intensity at which the communication relay is possible. The less limit intensity is stored in the auxiliary storage unit 13. The determination unit 106 determines whether or not the radio wave intensity of the signal measured by the radio wave intensity measuring unit 105 is lower than the lower limit intensity, and transmits the determination result to the communication control unit 104.

When the radio wave intensity of the mobile communication falls below the lower limit intensity, the communication control unit 104 generates a command to move the first vehicle 10 to an area where the radio wave intensity of the mobile communication is equal to or higher than the lower limit intensity. This command is transmitted from the communication control unit 104 to the service plan generation unit 101. The service plan generation unit 101 that has received this command generates a service plan so as to search for an area where the radio wave intensity is equal to or higher than the lower limit intensity. The travel control unit 103 allows the first vehicle 10 to autonomously travel according to the service plan, so that the radio wave intensity at a current location of the first vehicle 10 is kept as or above the lower limit intensity. Consequently, the communication between the wireless base station 40, and the second vehicle 20 and the user terminal 30 can be maintained.

When the radio wave intensity falls below the lower limit intensity, the communication control unit 104 transmits the service command to the service plan generation unit 101 to allow the first vehicle 10 to move, for example, in a direction in which the radio wave intensity becomes stronger. The radio wave intensity measuring unit 105 periodically measures the radio wave intensity, for example, and the communication control unit 104 predicts a place where the radio wave intensity becomes stronger based on the periodically measured radio wave intensity. The prediction can be implemented by known technologies. For example, when the radio wave intensity increases during traveling, the radio wave intensity can be further stronger by keeping going in the current traveling direction. On the other hand, when the radio wave intensity decreases during traveling, the radio wave intensity can be stronger by going in a direction opposite to the current traveling direction. Further, for example, the radio wave intensity for each area is stored in advance in the auxiliary storage unit 13, an area where the radio wave intensity is equal to or higher than the predetermined intensity is searched, and the service command is transmitted to the service plan generation unit 101 to allow the first vehicle 10 to move to the searched area.

Flow of Processing: First Vehicle

Figure 9:
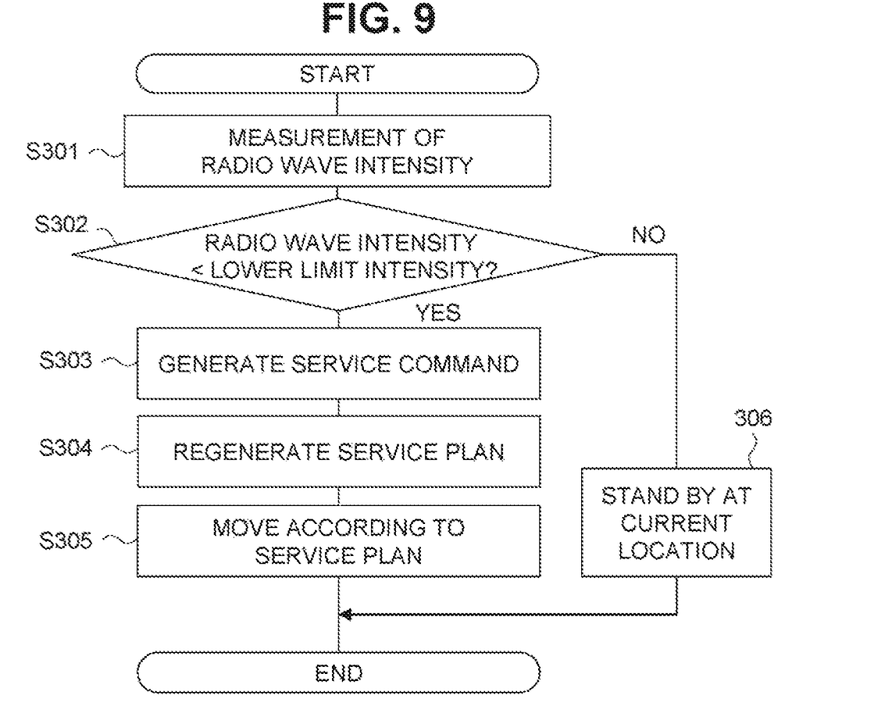
FIG. 9 is an exemplified flowchart illustrating a process of causing the first vehicle to travel according to the embodiment.

A process of causing the first vehicle 10 to travel will be described hereinbelow. FIG. 9 is an exemplified flowchart illustrating a process of the traveling of the first vehicle 10 according to the present embodiment. The process illustrated in FIG. 9 is executed at predetermined time intervals by the processor 11 of the first vehicle 10 which is unloaded from the second vehicle 20. The processor 11 in the present embodiment is one example of the control unit.

In step S301, the radio wave intensity measuring unit 105 measures (acquires) the radio wave intensity of the signal received by the wireless base station 40. In step S302, the determination unit 106 determines whether or not the measured radio wave intensity in step S301 is lower than the lower limit intensity. If it is determined as YES in step S302, the process proceeds to step S303. Otherwise, the process proceeds to step S306.

In step S303, the communication control unit 104 generates the service command for the service plan generation unit 101. The communication control unit 104 generates the command to move the first vehicle 10 to an area where the radio wave intensity of the mobile communication is equal to or higher than the lower limit intensity, and transmits the command to the service plan generation unit 101. For example, if the measured radio wave intensity acquired in step S301 of the current routine is lower than the measured radio wave intensity acquired by the radio wave intensity measuring unit 105 in step S301 of the previous routine, the communication control unit 104 generates the service command to travel in a direction opposite to the current traveling direction. Moreover, for example, if the measured radio wave intensity acquired in step S301 of the current routine is higher than the measured radio wave intensity acquired by the radio wave intensity measuring unit 105 in step S301 of the previous routine, the communication control unit 104 generates the service command to keep traveling in the current traveling direction. Further, for example, the communication control unit 104 generates the service command with an area which is previously stored in the auxiliary storage unit 13 and in which the radio wave intensity is equal to or higher than the lower limit intensity as a destination.

In step S304, the service plan generation unit 101 generates the service plan again according to the service command. Then, in step S305, the travel control unit 103 controls the drive unit 15 to allow the first vehicle 10 to travel according to the regenerated service plan.

On the other hand, in step S306, since the radio wave intensity is equal to or higher than the lower limit intensity, the communication control unit 104 transmits the service command to the service plan generation unit 101 so that the first vehicle 10 stands by at the current location. Thereby, the service plan generation unit 101 generates the service plan in which the first vehicle 10 stands by at a place where parking is available, and allows the first vehicle 10 to stand by. Accordingly, a state in which the radio wave intensity is equal to or higher than the lower limit is maintained. In step S306, the service command may be generated such that the first vehicle 10 continuously travels within a predetermined range including the current location of the first vehicle 10.

Third Embodiment

Figure 10:
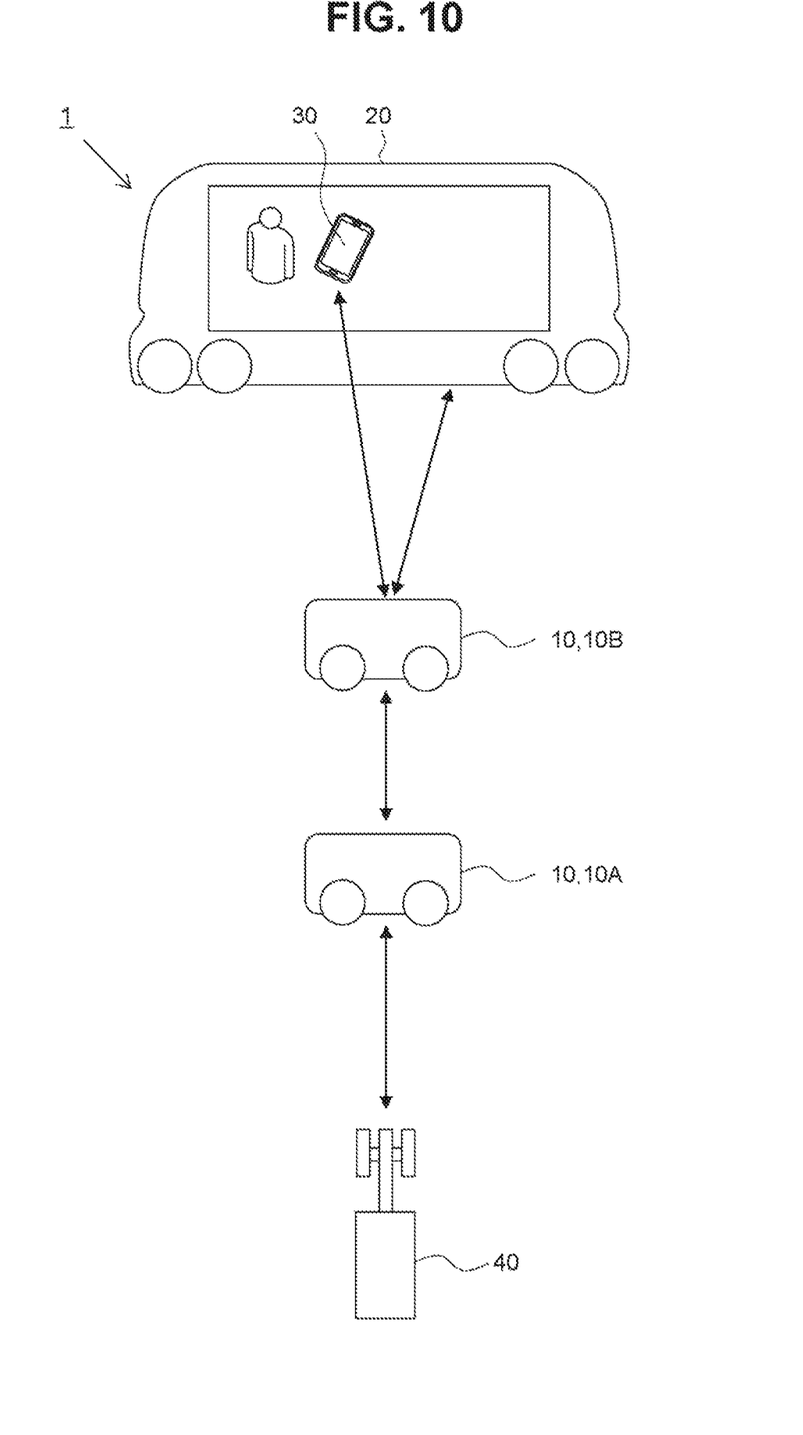
FIG. 10 is a diagram illustrating a schematic configuration example of the system according to a third embodiment.

According to a third embodiment, an example in which a plurality of first vehicles 10 are used to relay a longer distance communication will be described. FIG. 10 is a diagram illustrating a schematic configuration example of the system 1 according to the third embodiment of the present disclosure. The system 1 shown in FIG. 10 includes several first vehicles 10 (10A and 10B), the second vehicle 20, the user terminal 30, and the wireless base station 40. The first vehicles 10A and 10B are configured to be mountable on the second vehicle 20. In FIG. 10, two first vehicles 10A and 10B are exemplified, but the number of first vehicles 10 is not limited thereto; the first vehicles 10 can be used without limitations as long as the second vehicle 20 can transport them. Hereinafter, elements different from the first embodiment will be mainly described.

The first vehicle management unit 206 of the second vehicle 20 unloads the first vehicles 10 from the second vehicle 20 every time the radio wave intensity of the received signal is less than the predetermined intensity. In the example shown in FIG. 10, the first vehicle management unit 206 generates, in a case where it is determined, by the determination unit 205, that the radio wave intensity of the signal from the wireless base station 40 is less than the predetermined intensity, a command to unload the first vehicle 10A from the second vehicle 20. In response to this command, the travel control unit 203 controls the drive unit 25 to stop the second vehicle 20, and the first vehicle management unit 206 controls the unload device 26 so as to unload the first vehicle 10A. Further, the first vehicle management unit 206 generates a command to relay mobile communication by the first vehicle 10A to. In accordance with the command, the first vehicle 10A performs the communication relay.

The first vehicle management unit 206 generates, in a case where the communication is performed between the communication unit 24 of the second vehicle 20 and the first vehicle 10A, and it is determined, by the determination unit 205, that the radio wave intensity is less than the predetermined intensity in this communication, a command to unload the first vehicle 10B from the second vehicle 20. In response to this command, the travel control unit 203 controls the drive unit 25 to stop the second vehicle 20, and the first vehicle management unit 206 controls the unload device 26 so as to unload the first vehicle 10B. Further, the first vehicle management unit 206 generates a command to relay the mobile communication by the first vehicle 10B. In accordance with this command, the first vehicle 10B relays the communication between the first vehicle 10A that has been unloaded, with the second vehicle 20 and the user terminal 30. The process shown in FIG. 6 can be used for the process according to the present embodiment. Accordingly, every time the radio wave intensity of the signal received by the second vehicle 20 at a current location is less than the predetermined intensity, the first vehicle 10 is unloaded from the second vehicle 20. The first vehicles 10 perform the communication relay, thus the range in which the second vehicle 20 and the user terminal 30 can communicate can be further expanded.

Other Embodiments

The embodiments stated above are mere examples, and the present disclosure can be implemented with appropriate modifications within a scope not departing from the gist thereof. In the embodiments stated above, the second vehicle 20 includes the radio wave intensity measuring unit 204, the determination unit 205, and the first vehicle management unit 206. However, some or all of these functional components may be included in the first vehicle 10 or the user terminal 30.

For example, at least a part of the control unit of the present disclosure may be implemented by the processor 11 of the first vehicle 10 or a processor of the user terminal 30. For example, since a current location of the user terminal 30 can be considered to be the same as the current location of the second vehicle 20, the user terminal 30 may acquire the measurement of radio wave intensity of the mobile communication. Further, when the measurement of radio wave intensity acquired by the user terminal 30 is less than the predetermined intensity, the user terminal 30 may generate a command to unload the first vehicle 10 from the second vehicle 20 and transmit the command to the second vehicle 20. Further, the user terminal 30 may generate a command to relay the mobile communication by the land mobile station of the first vehicle 10, and transmit the command to the first vehicle 10.

For example, since a current location of the first vehicle 10 being transported by the second vehicle 20 can be considered to be the same as the current location of the second vehicle 20, the first vehicle 10 may acquire the measurement of radio wave intensity of the mobile communication. Further, when the measurement of radio wave intensity acquired by the first vehicle 10 is less than the predetermined intensity, the first vehicle 10 may generate a command to unload the first vehicle 10 from the second vehicle 20, and transmit the command to the second vehicle 20.

Further, information indicating the radio wave intensity at the current location of the second vehicle 20, acquired by any one of the first vehicle 10, the second vehicle 20 or the user terminal 30, may be transmitted to the external server which is remote from the second vehicle 20. The external server may execute, in a case where the acquired radio wave intensity is less than the predetermined intensity, generating the command to unload the first vehicle 10 from the second vehicle 20, and generating the command to relay the mobile communication by the land mobile station of the first vehicle 10.

The processing and units described in the present disclosure can be freely combined and implemented unless technical contradiction occurs.

Further, the processing described as being performed by a single device may be executed in a shared manner by a plurality of devices. Alternatively, the processing described as being performed by different devices may be executed by a single device. In the computer system, the hardware configuration (server configuration) for implementing each function can be flexibly changed.

The present disclosure can also be implemented by supplying a computer program for executing the functions described in the embodiments in a computer, and reading and executing the program by one or more processors included in the computer. Such a computer program may be provided to the computer by a non-transitory computer-readable storage medium connectable to a computer system bus, or may be provided to the computer via the network. Examples of the non-transitory computer-readable storage media include random disk (such as a magnetic disk (floppy (registered trademark) disk, hard disk drive (HDD), and the like) or optical disk (CD-ROM, DVD disk, Blu-ray disk, and the like)), read-only memory (ROM), random access memory (RAM), EPROM, EEPROM, magnetic card, flash memory, optical card, and random type of medium suitable for storing electronic instructions.

What is claimed is:

1. A system comprising:
a first vehicle equipped with a land mobile station for mobile communication; and
a second vehicle configured to transport the first vehicle and a user holding a terminal for the mobile communication,
wherein the system further comprises a control unit configured to:
acquire radio wave intensity of the mobile communication at a current location of the second vehicle,
generate, when the acquired radio wave intensity is less than a predetermined intensity, a command to unload the first vehicle from the second vehicle; and
generate a command to relay the mobile communication by the land mobile station of the first vehicle;
acquire the radio wave intensity of the mobile communication at a current location of the first vehicle after the first vehicle is unloaded from the second vehicle; and
generate, when the acquired radio wave intensity of the mobile communication at the current location of the first vehicle is less than a lower limit intensity that is less than the predetermined intensity, a command to move the first vehicle to an area where the radio wave intensity of the mobile communication is equal to or higher than the lower limit intensity.

2. The system according to claim 1, wherein:
the second vehicle is configured to transport a plurality of first vehicles;
the control unit is configured to, each time the radio wave intensity at the current location of the second vehicle is less than the predetermined intensity:
generate the command to unload the first vehicle from the second vehicle; and
generate the command to relay the mobile communication by the land mobile station of the first vehicle.

3. An information processing apparatus comprising:
a control unit configured to control a second vehicle, the second vehicle transporting a first vehicle that is equipped with a land mobile station for mobile communication and relays the mobile communication, and a user that holds a terminal for the mobile communication,
wherein the control unit is configured to:
acquire radio wave intensity of the mobile communication at a current location of the second vehicle,
generate, when the acquired radio wave intensity is less than a predetermined intensity, a command to unload the first vehicle from the second vehicle,
acquire the radio wave intensity of the mobile communication at a current location of the first vehicle after the first vehicle is unloaded from the second vehicle, and
generate, when the acquired radio wave intensity of the mobile communication at the current location of the first vehicle is less than a lower limit intensity that is less than the predetermined intensity, a command to move the first vehicle to an area where the radio wave intensity of the mobile communication is equal to or higher than the lower limit intensity.

4. The information processing apparatus according to claim 3, wherein:
the second vehicle is configured to transport a plurality of first vehicles;
the control unit is configured to, each time the radio wave intensity at the current location of the second vehicle is less than the predetermined intensity:
generate the command to unload the first vehicle from the second vehicle; and
generate the command to relay the mobile communication by the land mobile station of the first vehicle.

5. An information processing method that controls a second vehicle and is executed by a computer, the second vehicle transporting a first vehicle that is equipped with a land mobile station for mobile communication and relays the mobile communication and a user that holds a terminal for the mobile communication, the information processing method comprising:

acquiring radio wave intensity of the mobile communication at a current location of the second vehicle, and generating, when the acquired radio wave intensity is less than a predetermined intensity, a command to unload the first vehicle from the second vehicle, acquiring the radio wave intensity of the mobile communication at a current location of the first vehicle after the first vehicle is unloaded from the second vehicle; and generating, when the acquired radio wave intensity of the mobile communication at the current location of the first vehicle is less than a lower limit intensity that is less than the predetermined intensity, a command to move the first vehicle to an area where the radio wave intensity of the mobile communication is equal to or higher than the lower limit intensity.

6. The information processing method according to claim 5, wherein the second vehicle is configured to transport a plurality of first vehicles; and the information processing method further comprises, each time the radio wave intensity at the current location of the second vehicle is less than the predetermined intensity:

generating the command to unload the first vehicle from the second vehicle, and generating the command to relay the mobile communication by the land mobile station of the first vehicle.

* * * * *